US011156297B2

(12) United States Patent
Burmester et al.

(10) Patent No.: US 11,156,297 B2
(45) Date of Patent: Oct. 26, 2021

(54) DIAPHRAGM-SEALED DOUBLE-SEAT VALVE AND DRIVE

(71) Applicant: GEA Tuchenhagen GmbH, Büchen (DE)

(72) Inventors: Jens Burmester, Grambek (DE); Jörg Pieplow, Lübeck (DE); Stephanie Tegtmeyer, Hamburg (DE)

(73) Assignee: GEA Tuchenhagen GmbH, Büchen (DE)

( * ) Notice: Subject to any disclaimer, the term of this patent is extended or adjusted under 35 U.S.C. 154(b) by 24 days.

(21) Appl. No.: 16/616,719

(22) PCT Filed: May 14, 2018

(86) PCT No.: PCT/EP2018/062377
§ 371 (c)(1),
(2) Date: Nov. 25, 2019

(87) PCT Pub. No.: WO2018/215229
PCT Pub. Date: Nov. 29, 2018

(65) Prior Publication Data
US 2021/0025504 A1    Jan. 28, 2021

(30) Foreign Application Priority Data

May 26, 2017 (DE) ..................... 10 2017 005 062.7

(51) Int. Cl.
*F16K 1/44* (2006.01)
*F16K 1/50* (2006.01)
*F16K 41/12* (2006.01)

(52) U.S. Cl.
CPC .............. *F16K 1/446* (2013.01); *F16K 1/50* (2013.01); *F16K 41/12* (2013.01)

(58) Field of Classification Search
CPC . F16K 1/44; F16K 1/443; F16K 1/446; F16K 1/46; F16K 1/50; F16K 41/10; F16K 41/12; F16K 31/1225
See application file for complete search history.

(56) References Cited

U.S. PATENT DOCUMENTS

2014/0326341 A1   11/2014   Fath et al.

FOREIGN PATENT DOCUMENTS

| DE | 10 2006 025 653 A1 | 9/2007 |
| EP | 2734757 B1 | 12/2014 |

(Continued)

OTHER PUBLICATIONS

Notification of Reasons for Refusal in corresponding JP 2019-563005, dated Jul. 1, 2021, and its English translation, 9 pgs.

*Primary Examiner* — Hailey K. Do
(74) *Attorney, Agent, or Firm* — Young Basile Hanlon & MacFarlane, P.C.

(57) ABSTRACT

A double-seat valve includes a first closing element associated with a first valve seat, a second closing element associated with a second valve seat, a hollow rod connected to the second closing element, a valve rod connected to the first closing element and extending through the hollow rod, a first diaphragm fastened to the hollow rod and to a housing of the valve, and a second diaphragm arranged to seal a channel between the valve rod and hollow rod. The second closing element includes an annular body connected to a supporting section, the annular body and the supporting section designed to clamp the second diaphragm and the connection region to a gap seal against an interior. To simplify the design and to ensure reliable functioning under hygienic conditions, the supporting section has a leakage channel that forms a section of a fluid connection between the connection region and the channel.

20 Claims, 5 Drawing Sheets

(56) References Cited

FOREIGN PATENT DOCUMENTS

| | | |
|---|---|---|
| JP | 2016-503155 A | 2/2016 |
| WO | 2013/170931 A1 | 11/2013 |

DIAPHRAGM-SEALED DOUBLE-SEAT VALVE AND DRIVE

TECHNICAL FIELD

The invention relates to a diaphragm-sealed double-seat valve.

BACKGROUND

Single-seat valves comprising a substantially annular diaphragm, which comprises an inner edge and an outer edge and of which the inner edge is directly or indirectly secured to a closing element and of which the outer edge is secured to the housing of the single-seat valve, are known in the prior art, for example from WO 2013/170931 A1.

Double-seat valves comprising a first and a second closing element that each cooperate with an associated valve seat, it being possible to bring the closing elements into vented positions independently of one another, are also fields of application. In valves of this kind, an aim is to arrange a second diaphragm between the closing elements. In this way, the gap between the valve rods, which engage in one another in the manner of a telescope, is sealed.

Various solutions have been proposed in the prior art, in particular in DE 102006025653 A1 and EP 2734757 B1. The two valves proposed therein have valve rods and closing bodies that are composed of many individual parts.

BRIEF SUMMARY

An object of this disclosure is to introduce a double-seat valve comprising two diaphragms that has a simple design and of which reliable functioning is ensured.

A double-seat valve is proposed, which comprises a first and a second closing element respectively associated with a first and a second valve seat, a hollow rod, which is connected to the second closing element, a valve rod, which is connected to the first closing element and is arranged extending through the hollow rod, a first diaphragm, which is fastened to the hollow rod and to a housing of the double-seat valve, and a second diaphragm, which is arranged so as to seal a channel between the valve rod and the hollow rod, the second closing element comprising an annular body, which is connected to a supporting section, the annular body and the supporting section being designed to clamp the second diaphragm and being sealed against one another to the second diaphragm and to a gap seal. The supporting section comprises a leakage channel that forms a section of a fluid connection between the connection region and the channel. If the second diaphragm or the gap seal become leaky and fluid enters the connection region, this can be detected on account of the proposed design. This, in combination with the use of two diaphragms, provides for a hygienic design during operation with reliable detection of functional impairments, for example the failure of the second diaphragm. The design has few individual parts compared with the prior art and is therefore more cost-effective and can be assembled and put into operation more quickly and reliably.

The design of the double-seat valve is additionally simplified if the hollow rod extends in one piece through the first diaphragm and a first clamping element in the direction of a lift axis. This also does away with a potential point of damage.

According to another advantageous development, a second bearing is arranged so as to bear and guide a second clamping element. As a result, a large gap between the valve rod and the hollow rod is possible. This large gap in turns provides for more reliable and improved detection of leakage, which occurs in the event of failure of the second diaphragm or the gap seal.

In a development of the double-seat valve, the gap seal is designed and arranged so as to cooperate with the second valve seat. As a result, the valve can be cleaned more easily and the number of locations at which residual fluid can accumulate is reduced.

In a development of the double-seat valve, a securing means that prevents rotation of the first and second part relative to one another is arranged on the second closing element. This ensures reliable functioning of the double-seat valve and prevents release of the connection of the first and second part, in particular during operation.

The sealing function of the diaphragms and the useful life are increased if the introduction of a torsional force, which leads to mechanical straining of the fixing points of the diaphragms and of the diaphragms themselves, is prevented. In order to achieve this, according to an embodiment of the invention, a main drive comprises a piston that can be moved in a cylinder as well as a drive rod and a spring, and a first rotation stabilization means is provided, which stabilizes a lifting movement of the valve rod or the hollow rod against rotation.

According to a first embodiment of the rotation stabilization means, said means comprises a sliding bearing that bears the piston rotatably on the drive rod. This is a cost-effective and reliable embodiment.

An additional cost-effective embodiment of the rotation stabilization means consists in the first rotation stabilization means comprising a piston section having a recess that receives a bar, the bar being movable in the recess only in the direction of the lift axis.

If an auxiliary drive is provided, a second rotation stabilization means can be provided in the auxiliary drive. This makes it possible to prevent a torsional force from acting on the valve rod and/or hollow rod as early as at the drive. This simplifies the design of the valve in the region of the valve rod and hollow rod.

The design variants disclosed are advantageous since they make it possible to allow large particles in the fluid to flow through the double-seat valve and prevent blockage.

In the following, the invention will be described and the advantages explained based on exemplary embodiments.

DETAILED DESCRIPTION

Figure 1:
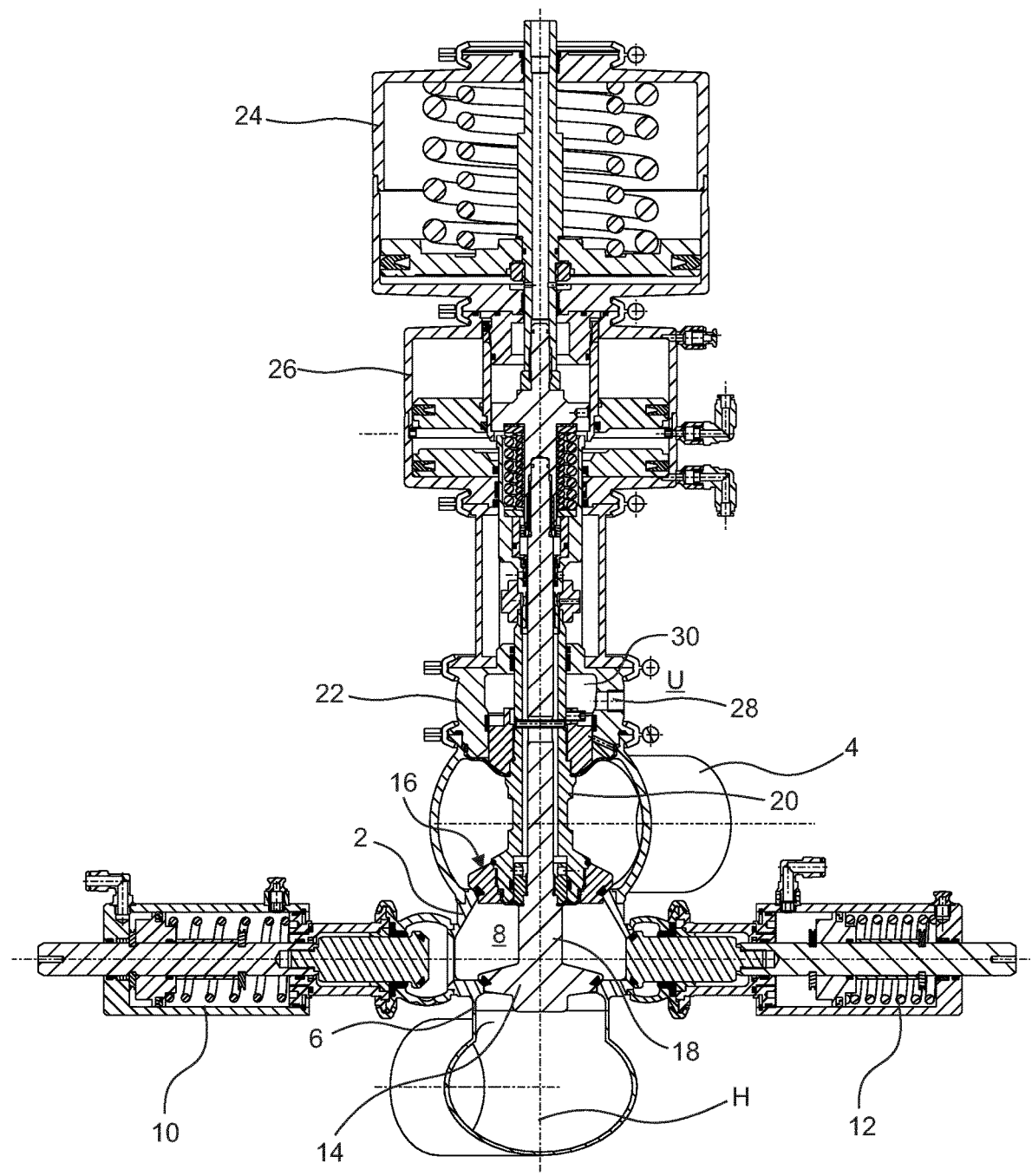
FIG. 1 is a cross-section through a double-seat valve comprising two diaphragms.

FIG. 1 shows a double-seat valve in a cross-section along a longitudinal lift axis H. The double-seat valve comprises a housing 2 having a first port 4 and a second port 6. A fluid path between the first port 4 and the second port 6 is formed in the housing 2 and extends in part in an intermediate chamber or space 8.

A first side valve 10 and preferably a second side valve 12 are connected to the housing 2 such that they can be fluidically connected to the intermediate chamber 8. By means of said side valves 10 and 12, leakage from the intermediate chamber 8 can be guided away out of the double-seat valve and the intermediate chamber 8 can be cleaned, for example. It is also possible to form a sterile barrier, for example a baffle, in the intermediate chamber 8. Advantageously, at least one of the side valves 10 and 12 is connected to the intermediate chamber 8 such that fluid can flow out of said chamber without leaving any residue if the lift axis H is oriented in parallel with the force of gravity.

A first and a second closing element 14 and 16 are arranged inside the housing 2 such that they can move along the lift axis H. The first closing element 14 is connected to a valve rod 18. The second closing element 16 is connected to a hollow rod 20, the valve rod 18 being arranged at least over part of the extent thereof inside the hollow rod 20 and the valve rod 18 and the hollow rod 20 extending along the lift axis H and being formed of one or multiple parts. The rods 18 and 20 are guided out of the housing 2 and extend through a housing part 22. The valve rod 18 and hollow rod 20 are operatively connected to a main drive 24 outside of the housing 2.

The main drive 24 is preferably a pneumatic drive and is designed to bring about an open position and a closed position of the double-seat valve. In the open position, a fluid connection is established between the first port and the second port. In the closed position, said fluid connection is blocked. The assembly consisting of the valve rod 18, hollow rod 20 and main drive 24 can be designed such that, through the effect of the main drive 24, the valve rod 18 moves and the hollow rod 20 is taken along in this movement.

An auxiliary drive 26 that may also be designed as a pneumatic drive may be provided. Said auxiliary drive 26 is preferably designed to move the valve rod 18 and the hollow rod 20 independently of one another along the lift axis H. The rods 18 and 20 are thereby brought in partial lift positions, in which in each case one of the closing elements 14 and 16 remains in the closed position while the other closing element 14 and 16 is brought into an open position.

The drives 24 and 26 are directly or indirectly mechanically connected to the housing part 22. The housing part 22 comprises a leakage outlet 28, by means of which a collection space 30 inside the housing part can be connected to the surroundings U of the housing part.

Figure 2:
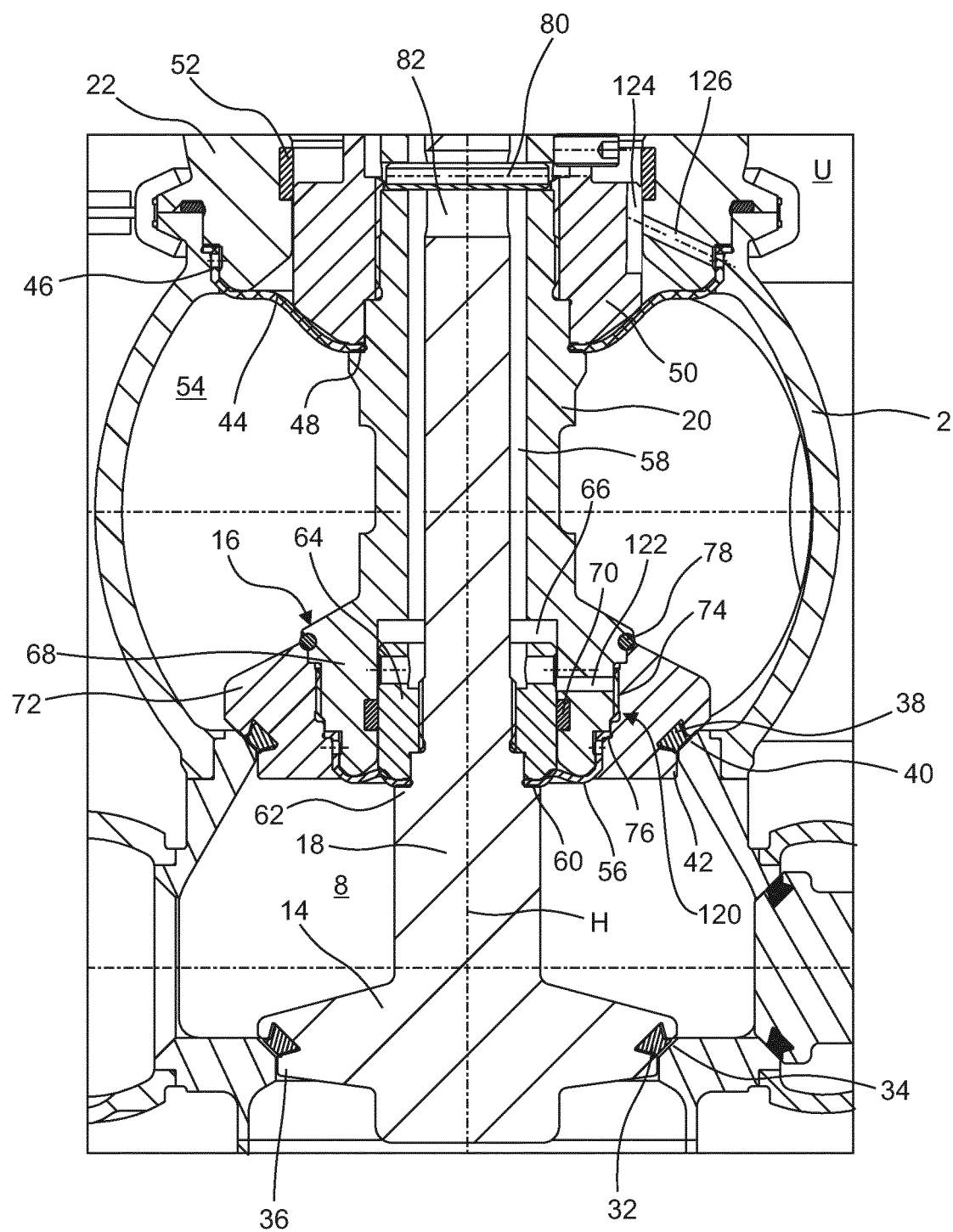
FIG. 2 is a detailed cross-sectional view of the region of the second diaphragm.

In order to better illustrate the invention, the region of the housing 2 is shown in a detailed cross-sectional view in FIG. 2.

A first seal 32 is received in a groove on the first closing element 14. Said first seal 32 cooperates in a sealing manner with a first valve seat 34 in the closed position of the first closing element 14. The first seal 32 is axially sealing or semi-axially sealing. The first closing element 14 may comprise a first projection 36, which is arranged and shaped such that a choke gap is formed between the first projection 36 and the housing 2 in the partial lift position of the first closing element 14. A choke gap in particular causes the fluid flowing through same to accelerate and thus improves cleaning, which is carried out in the partial lift position.

A second seal 38 is received in a groove on the second closing element 16. Said second seal 38 cooperates in a sealing manner with a second valve seat 40 in the closed position of the second closing element 16. The second seal 38 is axially sealing or semi-axially sealing. The second closing element 16 may comprise a second projection 42, which is arranged and shaped such that a choke gap is formed between the second projection 42 and the housing 2 in the partial lift position of the second closing element 16.

A substantially annular first diaphragm 44 comprises an outer edge 46 that is secured between the housing part 22 and the housing 2. In order to allow lifting, the first diaphragm 44 has a wavy cross-section such that an inner edge 48 of the first diaphragm 44 is everted in the manner of a dome. Said inner edge 48 is secured to the hollow rod 20. A first clamping element 50 that can be fixed on the hollow rod 20 may be provided for this purpose. Advantageously, the clamping element 50 is designed such that the first diaphragm 44 rests in part against the clamping element 50, such that the first diaphragm 44 is relieved of the pressure of the fluid in the double-seat valve. A leakage groove 124 that preferably extends approximately in the direction of the lift axis H may be provided on an outer wall of the clamping element 50. Said groove may be designed to extend only over a part of the outer wall remote from the diaphragm 44 and cooperate in a fluid-guiding manner with a transverse channel 126 in the housing part 22. Leakages caused by a leaky first diaphragm 44 can be guided away out of the double-seat valve by means of the leakage groove 124 and the optional transverse channel 126 and thus detected more reliably.

A recess that receives the clamping element 50 is provided in the housing part 22. A first bearing 52 is arranged in said recess and slidingly bears the clamping element 50 such that said clamping element can be moved within the recess along the lift axis H.

The first diaphragm 44 arranged in this manner seals an interior 54 of the double-seat valve against the surroundings U.

A second diaphragm 56 is provided on the second closing element 16 in order to seal a channel 58 formed between the valve rod 18 and the hollow rod 20 against the intermediate space 8.

The second diaphragm 56 comprises an inner edge 60 that is clamped and thus secured between a shoulder 62 on the valve rod 18 and a second clamping element 64. The second clamping element 64 is received in an extension 66 of the channel 58, the extension 66 being arranged in a supporting section 68 of the hollow rod 20. A second bearing 70 is received in the supporting section 68. The position and material of the second bearing 70 are selected for guiding and bearing an axial movement of the second clamping element 64 in the extension 66. In this way, the second clamping element 64 is directly and the valve rod 18 is indirectly borne and guided during the lifting movement along the lift axis H. Said guiding is highly precise, since it takes place on a large diameter. In addition, this design allows for a channel 58 having a large sectional area of flow, which is larger compared with the known prior art. The signaling of a leakage, which for example indicates that the second diaphragm 56 needs to be changed, is therefore greatly improved.

The supporting section 68 supports an annular body 72, which forms part of the second closing element 16 and supports the second seal 38. A thread 74 establishes a releasable connection between the supporting section 68 and the annular body 72. An outer edge 76 of the second diaphragm 56 is held between the supporting section 68 and the annular body 72, in particular by means of suitable guiding and clamping as well as a suitable positive engagement. The second diaphragm 56 simultaneously seals the thread 74 against the intermediate chamber 8. The connection, facing the interior 54, between the supporting section 68 and annular body 72 and thus the thread 74 are sealed by means of a gap seal 78. Said gap seal 78 is advantageously received in a groove on the supporting section 68 and is installed there before the annular body 72 is screwed onto the thread 74. This design makes it possible to design the surfaces of the supporting section 68 and annular body 72 facing the interior 54 as inclined surfaces and to shape them such that they drain particularly well, such that fluid drains from the second closing element 16 without leaving any residue and without being hindered by the gap seal 78.

A hollow pin 80 that extends through an elongate hole 82 in the valve rod 18 is held in the hollow rod 20. The elongate hole 82 is arranged and shaped such that, in cooperation with the hollow pin 80, it allows a movement of the valve rod 18 relative to the hollow rod 20 in the direction of the lift axis H, but such that a rotary movement of the rods 18 and 20 relative to one another is prevented. This prevents torsional straining of the second diaphragm 56. The hollow pin 80 may also be designed as a cylindrical pin made of solid material.

Figure 3:
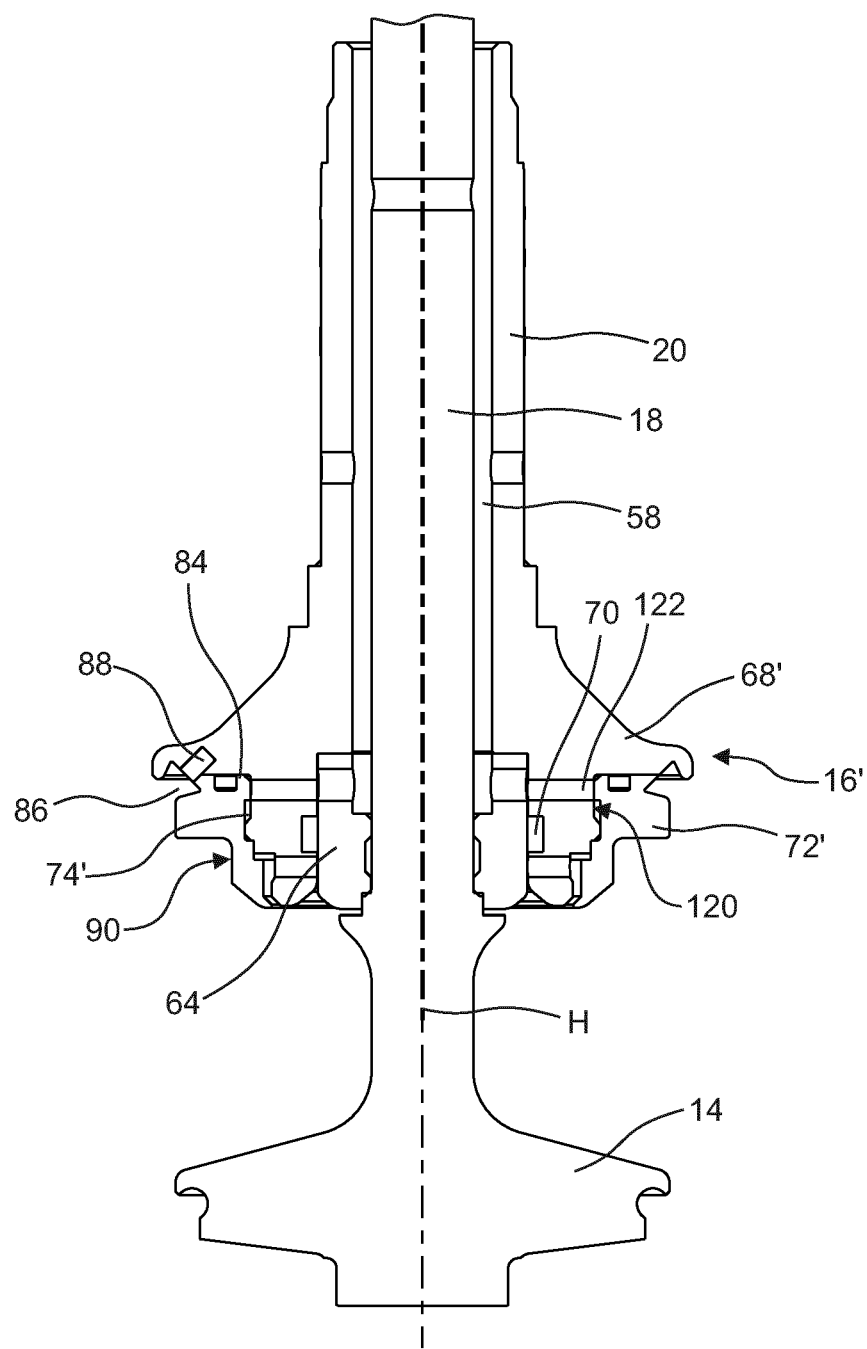
FIG. 3 is a detailed cross-sectional view of a double-seat valve comprising a split seal groove in the second disk.

FIG. 3 shows a development of the double-seat valve which in particular relates to the gap seal 78 and the second seal 38.

The first closing element 14 has been carried over unaltered from the previous example, as have the valve rod 18 and the hollow rod 20. The substantial change relates to the second closing element 16'.

The second closing element 16' comprises an annular body 72' that is connected to a supporting section 68', for example by means of a thread 74'. In order to simplify the seal arrangement and in order to be able to dispense with a seal, a joint 84 between the supporting section 68' and the annular body 72' is formed in the connection region 120 such that it ends at a seal groove 86, which is shaped to receive the gap seal 78. The contour of the seal groove 86 may extend in part into the supporting section 68' and annular body 72'. On account of this design, the gap seal 78, in addition to sealing the connection region 120, takes on the function of the second seal 38 and cooperates with the second valve seat 40. Aside from a reduced number of parts, an additional advantage is that a more hygienic design is achieved, inter alia because said arrangement can be cleaned more easily.

In order to prevent the screw connection between the supporting section 68' and the annular body 72' from becoming released, it is advantageous to provide a securing means 88, for example a set screw. The securing means 88 forms a rotation-preventing positive engagement with the annular body 72' and the supporting section 68'. It is advantageous to arrange the securing means at the base of the seal groove 86, such that said means is covered by the second seal 38 in the assembled state of the double-seat valve and is thus inaccessible to fluid in the double-seat valve.

The annular body 72' advantageously comprises at least one neck surface 90 on a side remote from the supporting section 68'. Said neck surface is designed to cooperate with a tool used to establish the screw connection between the supporting section 68' and the annular body 72'.

Figure 4:
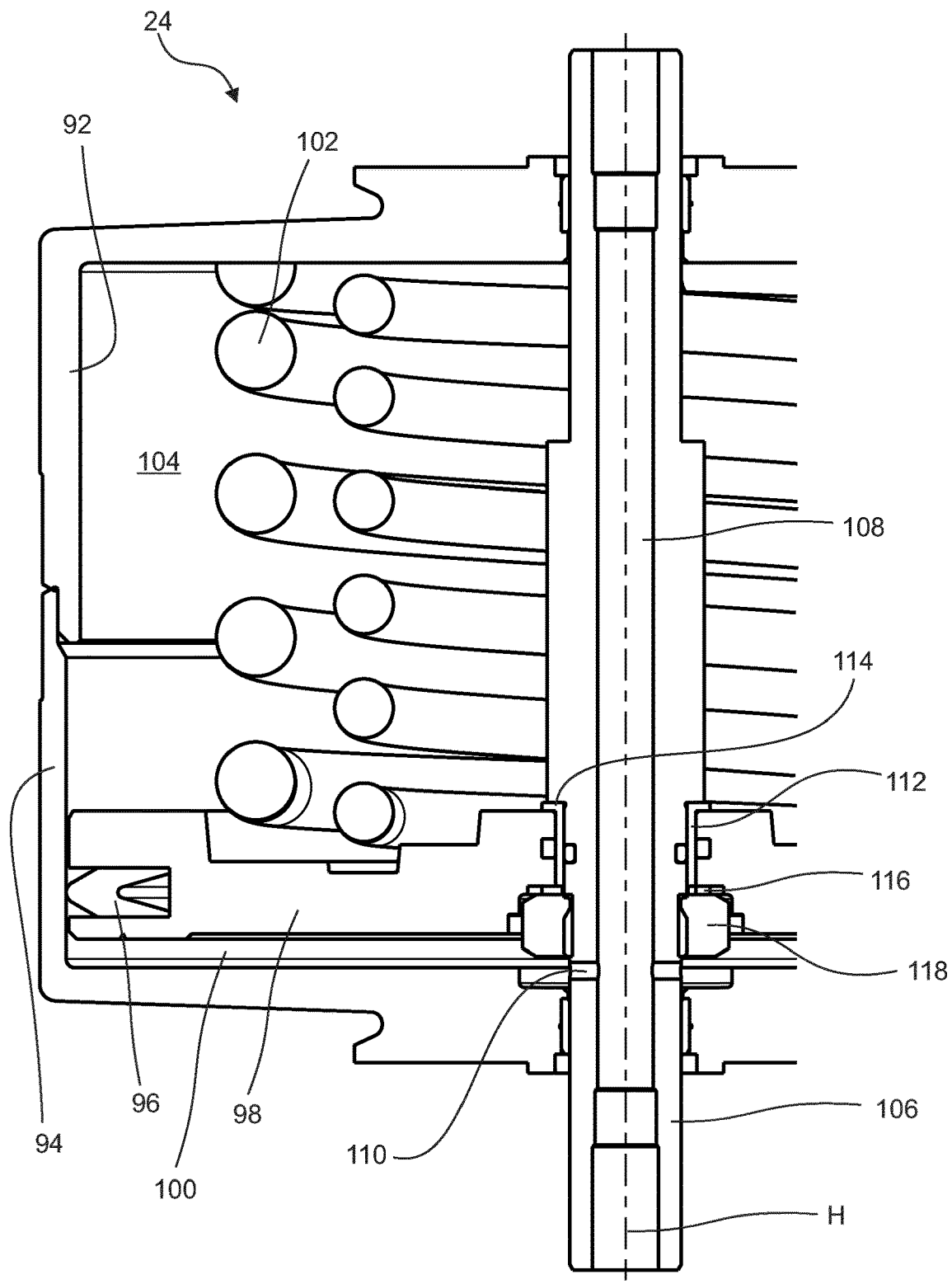
FIG. 4 is a cross-section through a pneumatic drive.

FIG. 4 shows a detail from an advantageous embodiment of the main drive 24 operated by a pressure medium.

The main drive 24 comprises a first cylinder part 92 and a second cylinder part 94. The cylinder parts 92 and 94 together form a drive housing and a running surface of the main drive 24. A piston seal 96 that is received in a circumferential groove of a piston 98 slides on said running surface. The piston 98 divides an interior of the main drive 24 into two chambers. One is a pressure medium chamber 100, in which a pressure medium, generally a gas, can be admitted in order to generate a force on the piston 98 that causes a displacement of the piston 98 along the lift axis H. The force thereby acts counter to a restoring force, which is generated by a spring 102 located in the spring chamber 104, which is the second chamber.

The piston 98 is fastened on a drive rod 106 to which the lifting movement is transferred. Said drive rod 106 can be directly or indirectly connected to the valve rod 18 in order to trigger the movement of the first valve disk 14.

The drive rod 106 may comprise a pressure medium channel 108. At least one inlet 110 in the drive rod 106 establishes a fluid connection between the pressure medium channel 108 and the pressure medium chamber 100.

During compression and subsequent expansion of the spring 102, a torque is produced on account of the torsion and said torque acts on the piston 98. In order to prevent the torque from being transferred to the drive rod 106 and thus ultimately to the second diaphragm 56, a first rotation stabilization means is provided. A cost-effective embodiment of the rotation stabilization means is that of a sliding bearing, by means of which the piston 98 is rotatably borne on the drive rod 106. The first rotation stabilization means, or respectively sliding bearing, comprises a bearing bush 112 having a flange 114. Said bearing bush forms the sliding bearing for the piston 98 together with a bearing washer 116. A securing nut 118 fastens the sliding bearing and piston 98 on the drive rod 106 and ensures defined force conditions in the sliding bearing. The bearing bush 112 and bearing washer 116 may consist of a cost-effective and suitable material, such as polytetrafluoroethylene (PTFE).

Figure 5:
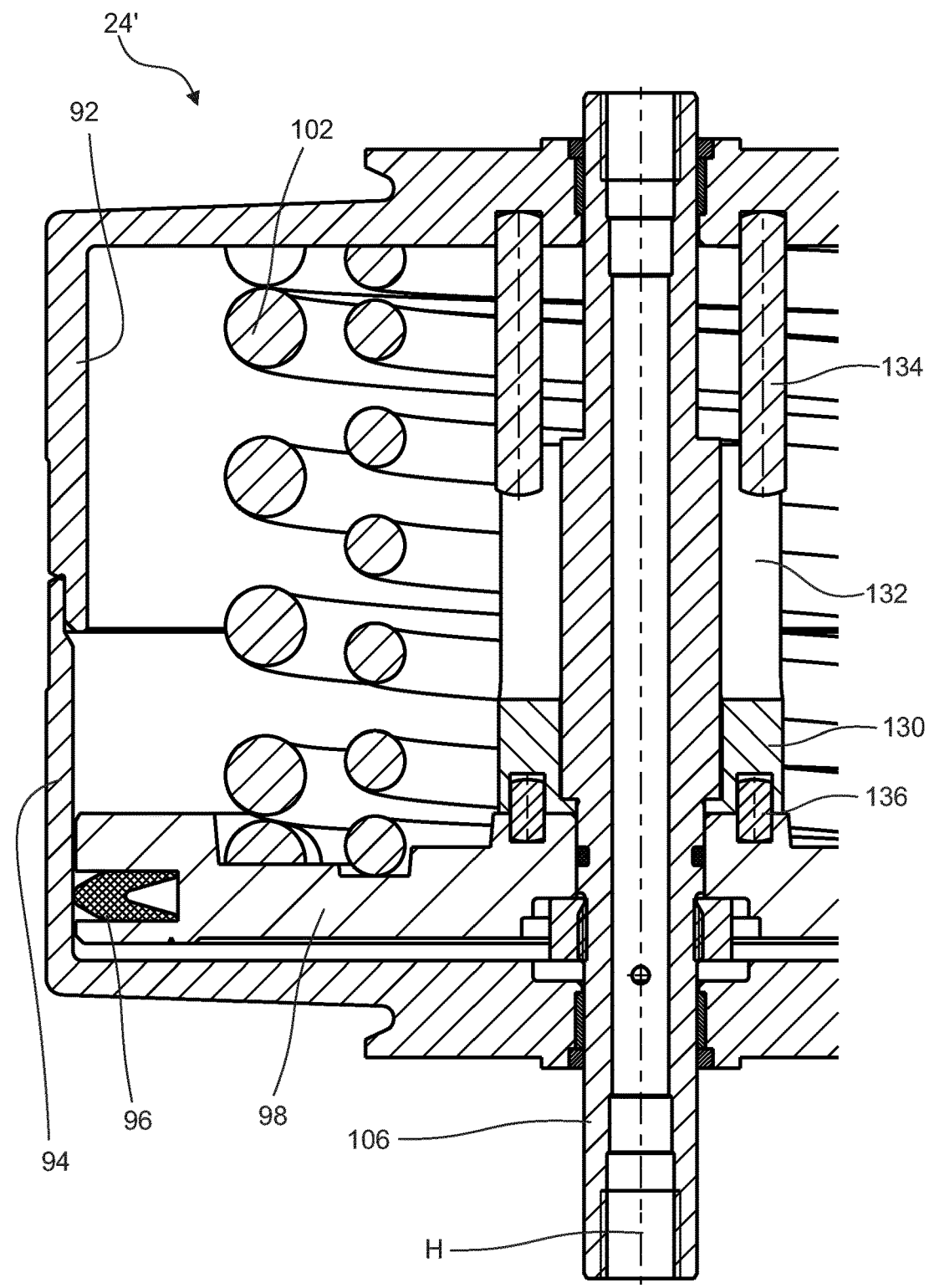
FIG. 5 is an alternative embodiment of the first rotation stabilization means in the main drive of FIG. 1.

FIG. 5 shows an alternative embodiment of the first rotation stabilization means in the main drive 24'. The piston 98 comprises a piston section 130 that extends along the lift axis H so as to surround the drive rod 106 and is surrounded by the spring 102. The piston section 130 comprises a recess 132 that receives a bar 134, which is connected to an end plate of the first cylinder part 92. The recess 132 extends in the direction of the lift axis H and covers only part of the circumference in the circumferential direction. The recess 132 and bar 134 are dimensioned such that the bar 134 can carry out a movement in the direction of the lift axis H, but such that a movement in the circumferential direction is blocked. This can be achieved, for example, by means of a round bar, the longitudinal axis of which extends in a longitudinal slot, the width of which approximately corresponds to the diameter of the round bar. In this way, a torsional force introduced into the piston 98 by the spring 102 is prevented from causing a rotation of the piston 98 and subsequent transfer of the rotation to the drive rod 106.

As an alternative or in addition to the hollow pin 80, which prevents the valve rod 18 and hollow rod 20 from rotating relative to one another, a second rotation stabilization means may also be provided in the auxiliary drive 26 in addition to a first rotation stabilization means in the main drive 24, 24'. Said second rotation stabilization means may be designed, for example, according to the principles explained in relation to FIG. 4 and FIG. 5. It may also be designed as a mechanical stop for the piston of the auxiliary drive 26 in the direction of rotation. By means of the rotation stabilization means, damaging torsion is prevented from acting on the diaphragms 44 and 56 and the useful life of the diaphragms is increased.

The following is a list of reference numbers used in the drawing figures.

2 Housing
4 First port

6 Second port
8 Intermediate chamber
10 First side valve
12 Second side valve
14 First closing element
16, 16' Second closing element
18 Valve rod
20 Hollow rod
22 Housing part
24, 24' Main drive
26 Auxiliary drive
28 Leakage outlet
30 Collection space
32 First seal
34 First valve seat
36 First projection
38 Second seal
40 Second valve seat
42 Second projection
44 First diaphragm
46 Outer edge of first diaphragm
48 Inner edge of first diaphragm
50 First clamping element
52 First bearing
54 Interior
56 Second diaphragm
58 Channel
60 Inner edge of second diaphragm
62 Shoulder
64 Second clamping element
66 Extension
68, 68' Supporting section
70 Second bearing
72, 72' Annular body
74, 74' Thread
76 Outer edge of second diaphragm
78 Gap seal
80 Hollow pin
82 Elongate hole
84 Joint
86 Seal groove
88 Securing means
90 Neck surface
92 First cylinder part
94 Second cylinder part
96 Piston seal
98 Piston
100 Pressure medium chamber
102 Spring
104 Spring chamber
106 Drive rod
108 Pressure medium channel
110 Inlet
112 Bearing bush
114 Flange
116 Bearing washer
118 Securing nut
120 Connection region
122 Leakage channel
124 Leakage groove
126 Transverse channel
130 Piston section
132 Recess
134 Bar
136 Connector

The invention claimed is:

1. A double-seat valve, comprising
a first closing element, which is associated with a first valve seat;
a second closing element, which is associated with a second valve seat;
a hollow rod, which is connected to the second closing element;
a valve rod, which is connected to the first closing element and is arranged extending through the hollow rod;
a first diaphragm, which is fastened to the hollow rod and to a housing of the double-seat valve; and
a second diaphragm, which is arranged so as to seal a channel between the valve rod and the hollow rod, wherein:
the second closing element comprises:
an annular body, which is connected in a connection region to a supporting section, the annular body and the supporting section being designed to clamp the second diaphragm, and the connection region being sealed to the second diaphragm and to a gap seal against an interior of the double-seat valve, and
the supporting section comprises a leakage channel that forms a section of a fluid connection between the connection region and the channel.

2. The double-seat valve according to claim 1, wherein the gap seal is designed and arranged so as to cooperate with the second valve seat.

3. The double-seat valve according to claim 2, further comprising:
a securing means that prevents the annular body and the supporting section from rotating relative to one another arranged on the second closing element.

4. The double-seat valve according to claim 1, further comprising:
a bearing is arranged so as to bear and guide a clamping element.

5. The double-seat valve according to claim 4, wherein the gap seal is designed and arranged so as to cooperate with the second valve seat.

6. The double-seat valve according to claim 5, further comprising:
a securing means that prevents the annular body and the supporting section from rotating relative to one another arranged on the second closing element.

7. The double-seat valve according to claim 1, wherein the hollow rod extends in one piece through the first diaphragm and a first clamping element in a direction of a lift axis.

8. The double-seat valve according to claim 7, further comprising:
a second bearing arranged so as to bear and guide a second clamping element.

9. The double-seat valve according to claim 7, wherein the gap seal is designed and arranged so as to cooperate with the second valve seat.

10. The double-seat valve according to claim 9, further comprising:
a securing means that prevents the annular body and the supporting section from rotating relative to one another arranged on the second closing element.

11. The double-seat valve according to claim 7, further comprising:
a main drive comprising a drive rod, a spring, and a piston that can be moved in a cylinder; and
a first rotation stabilization means that stabilizes a lifting movement of at least one of the valve rod or the hollow rod against rotation.

12. The double-seat valve according to claim 11, wherein the first rotation stabilization means comprises a sliding bearing that bears the piston rotatably on the drive rod.

13. The double-seat valve according to claim 11, wherein the first rotation stabilization means comprises a piston section having a recess that receives a bar, the bar being movable in the recess only in the direction of the lift axis.

14. The double-seat valve according to claim 11, further comprising:
   an auxiliary drive comprising a second rotation stabilization means.

15. The double-seat valve according to claim 1, further comprising:
   a main drive comprising a piston that can be moved in a cylinder, a drive rod, and a spring; and
   a first rotation stabilization means that stabilizes a lifting movement of at least one of the valve rod or the hollow rod against rotation.

16. The double-seat valve according to claim 15, further comprising:
   an auxiliary drive comprising a second rotation stabilization means.

17. The double-seat valve according to claim 15, wherein the first rotation stabilization means comprises a sliding bearing that bears the piston rotatably on the drive rod.

18. The double-seat valve according to claim 17, further comprising:
   an auxiliary drive comprising a second rotation stabilization means.

19. The double-seat valve according to claim 15, wherein the first rotation stabilization means comprises a piston section having a recess that receives a bar, the bar being movable in the recess only in a direction of a lift axis.

20. The double-seat valve according to claim 19, further comprising:
   an auxiliary drive comprising a second rotation stabilization means.

* * * * *